US007004596B2

(12) United States Patent
Merrem

(10) Patent No.: US 7,004,596 B2
(45) Date of Patent: Feb. 28, 2006

(54) ILLUMINATED DOCUMENT COPYHOLDER

(75) Inventor: Ralph Merrem, San Francisco, CA (US)

(73) Assignee: ACCO Brands USA LLC, Lincolnshire, IL (US)

( * ) Notice: Subject to any disclaimer, the term of this patent is extended or adjusted under 35 U.S.C. 154(b) by 0 days.

(21) Appl. No.: 10/894,659

(22) Filed: Jul. 19, 2004

(65) Prior Publication Data

US 2004/0264170 A1  Dec. 30, 2004

Related U.S. Application Data

(62) Division of application No. 10/314,435, filed on Dec. 5, 2002, now abandoned.

(60) Provisional application No. 60/338,364, filed on Dec. 7, 2001.

(51) Int. Cl.
*F21V 33/00* (2006.01)
(52) U.S. Cl. .......................... 362/98; 362/85; 362/109; 362/396; 362/253; 248/442.2
(58) Field of Classification Search .................. 362/98, 362/396, 85, 109, 253; 248/442.2, 918
See application file for complete search history.

(56) References Cited

U.S. PATENT DOCUMENTS

| | | | |
|---|---|---|---|
| 1,010,335 A | 11/1911 | Williams | |
| 1,673,595 A | 6/1928 | Scoggins | |
| 4,842,235 A | 6/1989 | Brown et al. | |
| 5,035,392 A * | 7/1991 | Gross et al. | 248/442.2 |
| 5,122,941 A * | 6/1992 | Gross et al. | 362/276 |
| D435,679 S | 12/2000 | Naghi | |
| 6,186,636 B1 | 2/2001 | Naghi | |
| 6,260,984 B1 | 7/2001 | Naghi | |
| 6,318,873 B1 | 11/2001 | Naghi | |
| D452,026 S | 12/2001 | Naghi | |
| 6,386,724 B1 | 5/2002 | Naghi | |
| 6,419,370 B1 | 7/2002 | Chen | |
| 6,575,593 B1 | 6/2003 | Krietzman | |
| 6,711,006 B1 | 3/2004 | Chen | |
| 2001/0028562 A1 | 10/2001 | Naghi | |

* cited by examiner

*Primary Examiner*—Thomas M. Sember
(74) *Attorney, Agent, or Firm*—Brian N. Young; Townsend and Townsend and Crew, LLP

(57) ABSTRACT

An object holder/illumination system for holding and/or positioning a first object with respect to a second object and illuminating the first object by accessing power from the second object. The system is especially useful as a copyholder/illumination system used in conjunction with a computing system such as a laptop computer, desktop or other portable electronic device.

16 Claims, 3 Drawing Sheets

ILLUMINATED DOCUMENT COPYHOLDER

CROSS REFERENCE TO RELATED APPLICATIONS

This application claims the priority of Provisional Application Ser. No. 60/338,364 filed Dec. 7, 2001, which is herein incorporated by reference for all purposes. This application is a divisional application of U.S. Application Ser. No. 10/314,435 filed Dec. 5, 2002 abandoned, the entire disclosure of which is herein incorporated by reference for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

BACKGROUND OF THE INVENTION

1. Field of the Invention

The present invention relates generally to a document illumination system and more specifically, to a portable illumination system for use with a computer system for illuminating a document in conjunction with use of the computer and an illuminated document copyholder.

2. Description of the Prior Art

It is well known to use copy holders in conjunction with the use of desktop computers. It is also known to provide copy holders for use in conjunction with the use of portable computers. Illumination of a portable device such as a portable computer is well known in the prior art, with the illumination generally directed towards the display of the device or the keys of the device. These devices usually obtain power from the portable device.

Oftentimes, copy holders will be used in conjunction with portable devices in poorly lit areas. This can make it difficult to read documents placed on the copy holder. This leads to problems for working and possibly, a user's eyesight.

SUMMARY OF THE INVENTION

The present invention provides a simple and efficient object holder/illumination systems for holding and positioning a first object with respect to a second object and illuminating the first object by accessing power from the second object. A preferred embodiment of the present invention is a copyholder/illumination system used in conjunction with a computing system such as a laptop computer, desktop or other portable electronic device.

One embodiment of the present invention includes an apparatus for illuminating a first object and positioning the first object relative to a second object. The apparatus has a plug for coupling into an input/output port having a source of electrical power; a flexible body having a first end coupled to the plug, the flexible body constructed to be manually reconfigurable to maintain the body in a desired dynamically established orientation; an illumination device coupled to a second end of the body and electrically communicated to the plug; a first clip coupled to the flexible member at a first attachment position for engaging the second object in a manner that inhibits relative movement between said first attachment position and the second object; and a second clip coupled to the flexible member at a second attachment position for engaging the first object in a manner that inhibits relative movement between the second attachment position and the first object; wherein the illumination device is powered by the source when the plug is electrically communicated to the port to illuminate the first object in the desired dynamically established orientation relative to the second object.

Another embodiment of the present invention includes a copy holder that includes a document panel against which a document or documents may be placed. A movable light source is coupled to at least one side edge of the document panel and extends across a face of a document panel. The light source is movable across the face of the document panel. Preferably, the light source is coupled to a portable device for receiving power therefrom. Alternatively, a battery may be included with the light source for providing power thereto.

In another embodiment of the present invention, a light source is pivotably coupled to an edge of the document panel. The light source is preferably coupled to a portable electronic device to receive power therefrom. Alternatively, the light source includes a battery for providing power thereto.

In yet another embodiment of the present invention, light sources are placed within edges of the document panel. Preferably, two light sources in opposing corners of the document panel are provided. Preferably, the light sources are LEDs. Additionally, LEDs may be provided behind the document panel and shine therethrough. The light sources are preferably coupled to a portable electronic device for receiving power therefrom. Alternatively, a battery may be included to provide power thereto.

These and other novel aspects of the present invention will be apparent to those of ordinary skill in the art upon review of the drawings and the remaining portions of the specification.

DETAILED DESCRIPTION OF THE INVENTION

Figure 1:
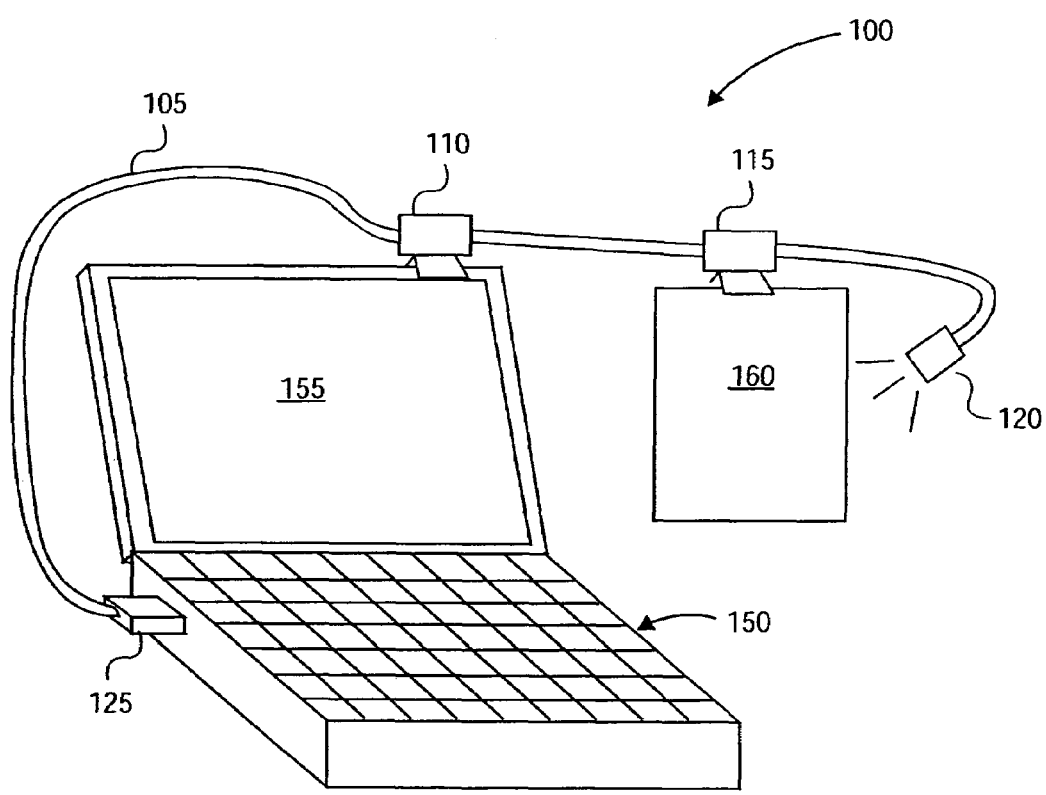
FIG. 1 is a perspective view of one embodiment for an illumination system, in accordance with the present invention.

FIG. 1 is a perspective view of one embodiment for an illumination system 100. System 100 includes a flexible body 105, a first clip 110, a second clip 115, an illumination device 120, and a plug 125. Flexible body 105 is constructed to be manually reconfigurable to position and maintain itself in virtually any dynamically established orientation. For example, flexible body 105 could be constructed of double helix wound wire in conventional fashion to form a structure that may be bent and twisted into almost any position, like a gooseneck for example. Other configurations for flexible body 105 are possible. For example, it is a preferred embodiment for body 105 to have two segments: a first segment that is a standard flexible wire extending from plug 125 to first clip 110, and a second segment that is the flexible body (having the shape/position retaining construction) extending from first clip 110 to second clip 115. Clip 110 and clip 115 are both sized and constructed to securely and releasably anchor objects. In this preferred embodiment, when illumination system 100 is used with a portable electronic device such as a laptop computer 150, clip 110 is adapted to anchor to a display screen 155 of computer 150. Clip 115 is adapted to clip and anchor one or more pages of a document 160.

Illumination device 120 is preferably a bright white, low power consuming LED (light emitting diode), but those skilled in the art will understand that other light and radiation emitting solutions may be substituted. Plug 125 is designed to engage an I/O port of a source of electrical power. For use with laptop 150, plug 125 is preferably configured to engage a connector that has a source of electrical power, such as, for example, a USB port or an IEEE 1394 (firewire) connector. The connector is coupled to a power source that is coupled in turn to laptop 150, which is typically a battery of laptop 150. Flexible body 105 communicates electrical power to illumination device 120, such as through an embedded electrical conductor or wire (IEEE 1394) or other powered port.

In other applications, when illumination system 100 is used with a desktop computer or in a desktop computing environment, plug 125 may be adapted to couple to a USB fire wire connector of the desktop computer, in which case a battery is typically not available and therefore the desktop computer and illumination system 100 are typically powered by the same source such as conventional utility power. When plug 125 is configured to engage a USB connector, illumination system 100 may be powered by coupling plug 125 to any active USB connector, such as those found on USB hubs used in conjunction with computing systems.

In operation, a user anchors first clip 110 to display screen 155 of laptop computer 150. The user then anchors document 160 to second clip 115, and dynamically establishes an orientation/position of second clip 115/document 160 relative to laptop screen 155. The user engages plug 125 with the power connector of laptop computer 150 to cause illumination device 120 to emit radiation (visible light in this case). The user positions illumination device 120 to direct the emitted radiation (light) to the desired location, which in a preferred embodiment is onto document 160.

The above-described arrangements of apparatus and methods are merely illustrative of applications of the principles of this invention and many other embodiments and modifications may be made without departing from the spirit and scope of the invention as defined in the claims.

Figure 2:
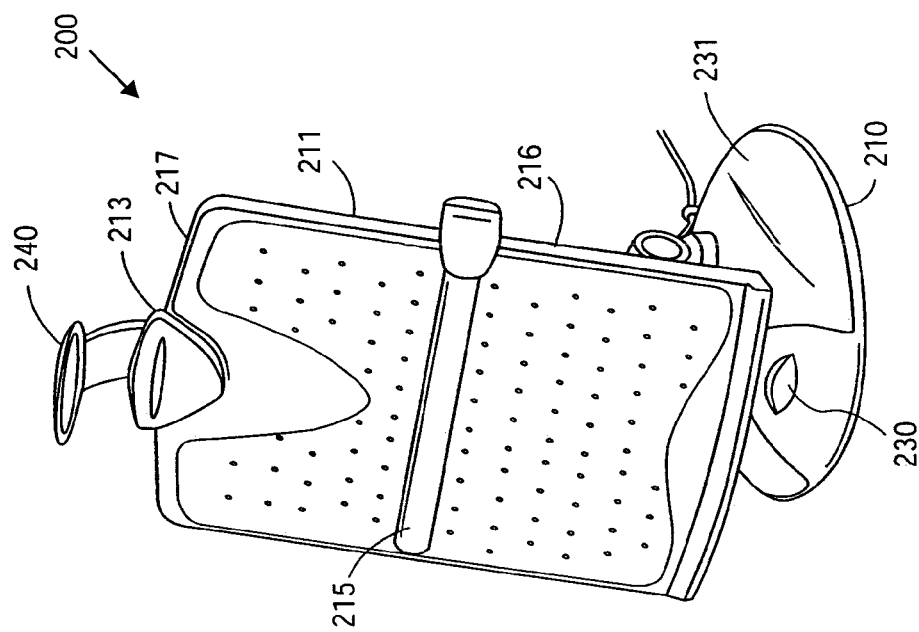
FIG. 2 is a perspective view of another embodiment for an illumination system in accordance with the present invention.
Figure 3:
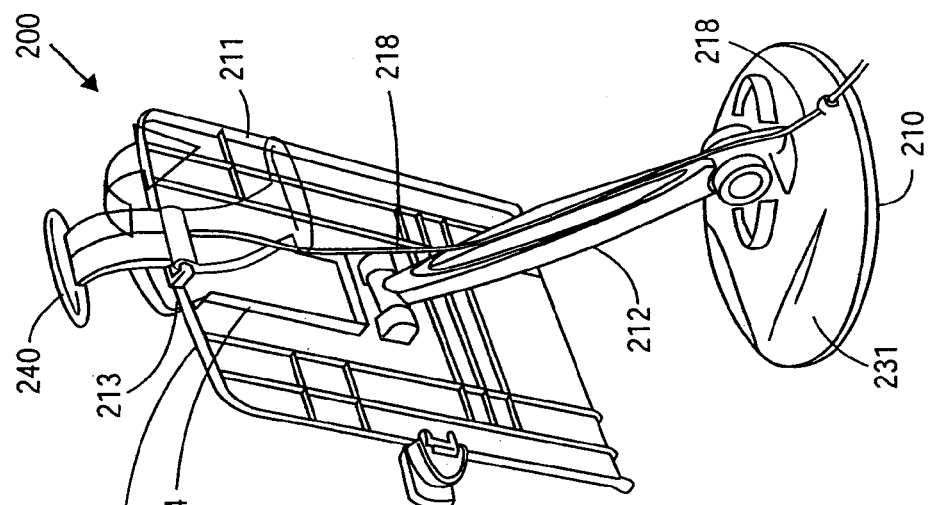
FIG. 3 is another perspective view of the illumination system illustrated in FIG. 2.
Figure 4:
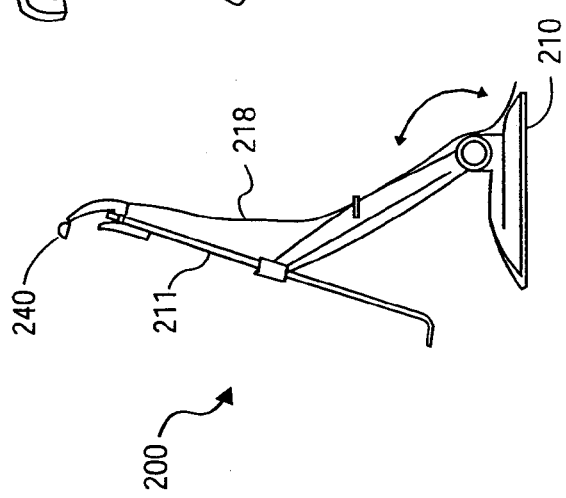
FIG. 4 is a side elevation view of the illumination system illustrated in FIGS. 2 and 3.

FIGS. 2–4 illustrate another embodiment of an illustration system 200 in accordance with the present invention. System 200 includes a base 210 and a document panel 211. The document panel is coupled to the base with an arm 212. Preferably, the document panel is coupled to the arm in a pivotable manner. Likewise, preferably the arm is coupled to the base in a pivotable manner. Indeed, preferably the arm is capable of pivoting with respect to the base in multiple directions.

Preferably, an extension 213 is provided with the copy holder. Preferably, the extension is capable of sliding within a sleeve 214 defined within the document panel. Additionally, preferably a ruler arm 215 is included and is coupled to at least one edge 216 of the document panel. The ruler arm is preferably movable along the document panel.

A light source 240 is preferably coupled to a top edge 217 of the document panel. Those skilled in the art will understand that the light may be coupled to any of the other edges if desired. Additionally, more than one light source may be coupled to edges of the document panel. Preferably, the light source is capable of pivoting as may be seen in FIG. 3. Those skilled in the art will understand that the light source may be coupled to the panel in such a way that it may pivot in more than one direction. A power cable 218 is preferably provided that is coupled to the light source and includes an appropriate plug (not shown) for coupling to a source of electrical power of a portable device, as has been previously discussed. Alternatively, a battery may be provided for the light source and, thus, system 200 would not need to be coupled to an electrical source of a portable device.

Figure 5:
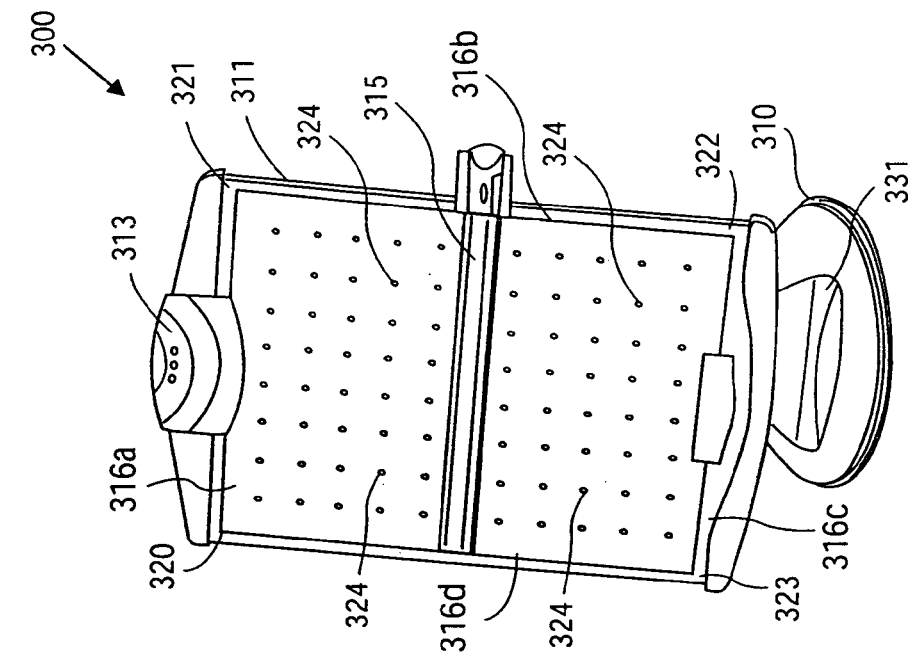
FIG. 5 is a perspective view of another embodiment of an illumination system in accordance with the present invention.
Figure 6:
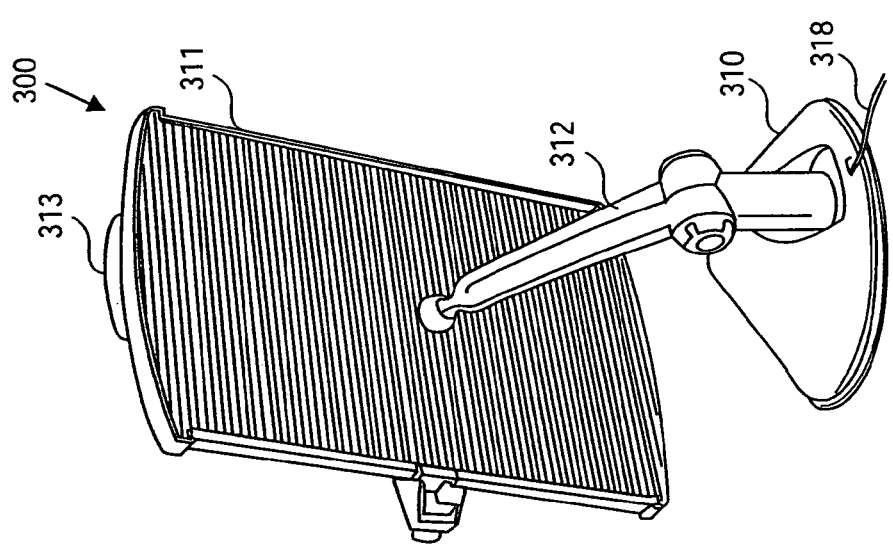
FIG. 6 is a second perspective view of the illumination system illustrated in FIG. 5.
Figure 7:
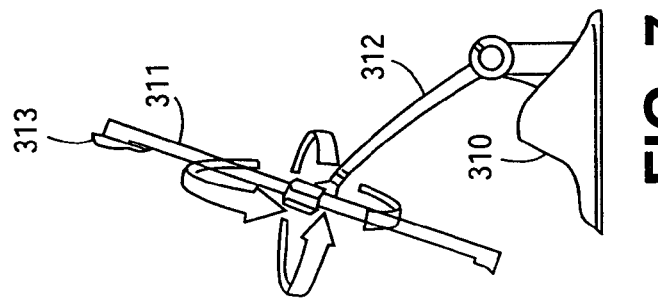
FIG. 7 is a side elevation view of the illumination system illustrated in FIGS. 5 and 6.

FIGS. 5–7 illustrate another embodiment of an illumination system 300 in accordance with the present invention. Illumination system 300 is very similar to illumination system 200 previously described. However, with illumination system 300, ruler arm 315 is preferably provided with a light source for illuminating documents on the copy holder. Alternatively, lights may be provided along edges 316a,b,c,d of document panel 311. The lights may be placed in opposing corners 320, 322, or all four corners 320, 321, 322, 323. If desired, a light source may be placed in only one or three corners. Additionally, light sources may be placed behind or within the document panel so that they produce light through one or more holes 324 defined within the document panel. The holes may or may not be covered with a type of protective cover if it is so desired.

Once again, the document panel is preferably coupled to base 310 with an arm 312 so that the document panel may pivot in one or more directions relative to the arm and the arm may pivot in one or more directions with regard to the base.

Additionally, preferably a power cable 318 is provided and coupled to the light source and is preferably coupled to an electrical source provided by a portable electronic device or other device as previously described herein. Once again, a battery may also be provided with system 300 to provide power to the light source independent of a separate device.

Also, bases 210, 310 may include peripheral items such as, for example, a clock 230 and a recess or tray 231, 331 for holding things such as, for example, stationery, clips, cell phones, pens, pencils, erasers, etc.

The above-described arrangements of apparatus and methods are merely illustrative of applications of the principles of this invention and many other embodiments and modifications may be made without departing from the spirit and scope of the invention as defined in the claims.

What is claimed is:

1. An apparatus for illuminating a first object and positioning the first object relative to a second object, comprising:
    a plug for coupling into an input/output port having a source of electrical power;

a flexible body having a first end coupled to said plug, said flexible body constructed to be manually reconfigurable to maintain said body in a desired dynamically established orientation;

an illumination device coupled to a second end of said body and electrically communicated to said plug;

a first clip coupled to said flexible body at a first attachment position for engaging the second object in a manner that inhibits relative movement between said first attachment position and the second object; and a second clip coupled to said flexible body at a second attachment position for engaging the first object in a manner that inhibits relative movement between said second attachment position and the first object;

wherein the illumination device is powered by said source when said plug is electrically communicated to said port to illuminate the first object in said desired dynamically established orientation relative to the second object.

2. The apparatus of claim 1 wherein the first object is a document and the second object is a portable computer device.

3. The apparatus of claim 2 wherein said power source is a battery of said portable computer device.

4. The apparatus of claim 1 wherein the first object is a document and the second object is a first subsystem of an electronic device.

5. The apparatus of claim 4 wherein said power source is a battery of said electronic device.

6. The apparatus of claim 4 wherein said power source is provided by a second subsystem of said electronic device.

7. The apparatus of claim 4 wherein said electronic device is a personal computing system and said first subsystem is a display of said personal computing system.

8. The apparatus of claim 6 wherein said electronic device is a personal computing system and said first subsystem is a display of said personal computing system and said second subsystem is a universal serial bus (USB) subsystem of said personal computing system.

9. A method for illuminating a document; comprising:

attaching a first clip to an electronic device, said electronic device associated with an I/O port coupled to a power source coupled to said electronic device, said first clip coupled to a flexible member having a plug for cooperative engagement with said port at a first end and an illumination device at a second end electrically communicated to said plug, with said flexible member constructed to be manually reconfigurable to maintain said member in a desired dynamically established orientation;

attaching the document to a second clip coupled to said flexible member;

engaging said plug with said port to cause said illumination device to emit light;

positioning said flexible member into a first desired orientation to maintain said flexible member into a first desired orientation wherein said document is in a desired position relative to said device; and positioning said flexible member into a second desired orientation to maintain said flexible member into a second desired orientation wherein said illumination device is in a desired position relative to the document and said first desired orientation is substantially unchanged.

10. The document illuminating method of claim 4 wherein said electronic device is a portable computer, said I/O port is provided as part of said portable computer, and said power supply is a battery for said portable computer.

11. An apparatus for illuminating a first object and positioning the first object relative to a second object, comprising:

a flexible body constructed to be manually reconfigurable to maintain the body in a desired dynamically established orientation;

a plug coupled to a first end portion of the flexible body;

an illumination device coupled to a second end portion of the body;

a first attachment element coupled to the flexible body at the first attachment position on the flexible body for engaging the second object in a manner that inhibits relative movement between the first attachment position and the second object, and a second attachment element attached to a second attachment position on the flexible body, wherein the illumination device is configured to illuminate the first object in the desired dynamically established orientation relative to the second object.

12. The apparatus of claim 11 wherein the plug is adapted for insertion into an input/output port in a portable electronic device having a source of electrical power.

13. The apparatus of claim 12 further comprising a power cord coupled to the plug.

14. The apparatus of claim 11 wherein the flexible body comprises a wire.

15. The apparatus of claim 11 wherein the first object is a document and the second object is a portable computer device.

16. The apparatus of claim 11 wherein the attachment element is a clip.

* * * * *